Figure 1:
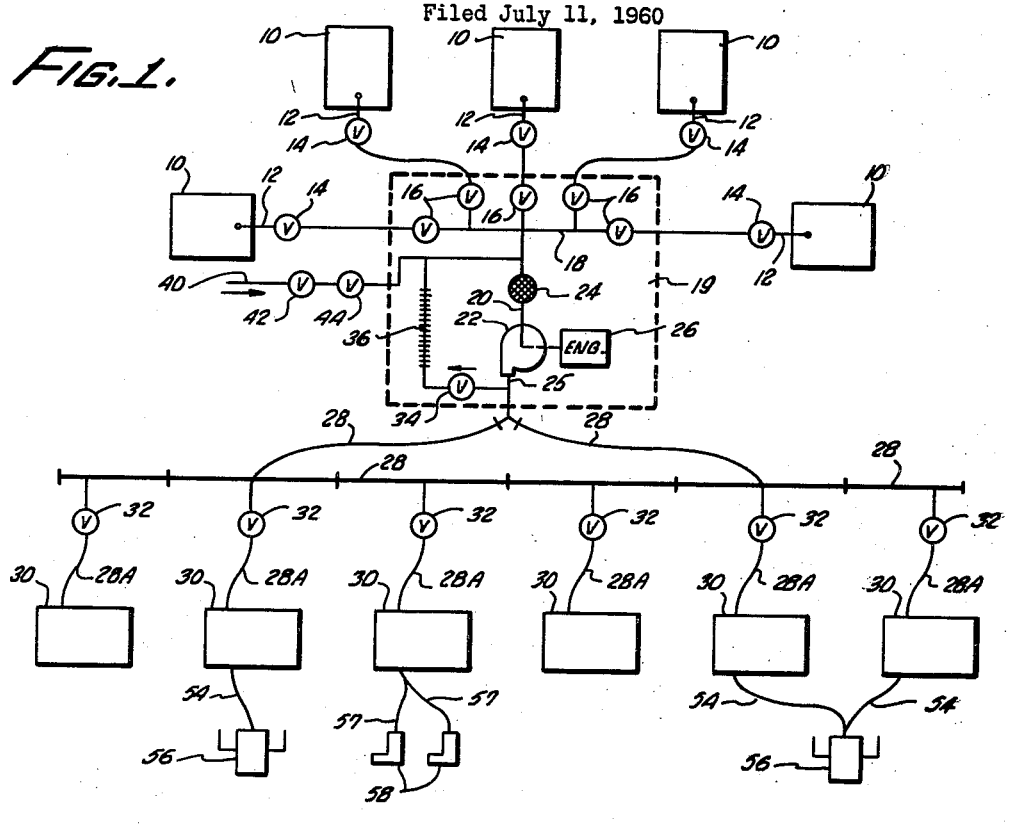

Nov. 26, 1963 R. T. HEADRICK 3,111,968
APPARATUS FOR TRANSPORTING FLUIDS
Filed July 11, 1960

INVENTOR.
RICHARD T. HEADRICK
BY
Christie, Parker & Hale
ATTORNEYS

United States Patent Office 3,111,968
Patented Nov. 26, 1963

3,111,968
APPARATUS FOR TRANSPORTING FLUIDS
Richard T. Headrick, La Canada, Calif.
(916 Crestfield, Duarte, Calif.)
Filed July 11, 1960, Ser. No. 42,104
3 Claims. (Cl. 141—21)

The present invention relates generally to apparatus for transporting fluids and more particularly to apparatus for transporting fuel between a reservoir and one or more vehicles such as aircraft.

In the past two decades, military strategy has become more and more dependent upon transportation by air. Inherent in this dependency is the requirement that new landing fields for aircraft be quickly and efficiently provided in areas where the transported materials are needed. In providing a new air field it is not only necessary to provide a suitable area for landing aircraft but it is also necessary to establish a system for refueling the supporting aircraft as well as operational combat aircraft based thereon. The apparatus for establishing such refueling system as well as the fuel supply therefor in many cases must be transported by air. Fueling apparatus to be suitable for this purpose must be of light weight, reliable and capable of being assembled into an operable system in a short time.

In prior art air transportable fueling apparatus collapsible rubber tanks have been utilized as a reservoir for storing the fuel and a high pressure pump has been provided for continuously circulating fuel from the collapsible tanks through a high pressure discharge hose to a plurality of servicing carts spaced along the flight line and back to the collapsible tanks. The servicing carts are provided to filter the fuel as it is being conveyed by the high pressure pump to individual aircraft. The high pressure pump provides a pressure of the order of 100 p.s.i. (pounds per square inch) in the discharge hose leading to the flight line servicing cars. The collapsible tanks are refilled by means of a supply system pump which pumps fuel from a tanker aircraft or other fuel carrying vehicle positioned at a particular location to the inlet of the collapsible tanks. A separate line is connected between the servicing carts and the collapsible tanks to drain fuel from the tanks of certain jet aircraft during the fueling process.

The use of such prior art apparatus has presented several problems in addition to those relating to weight, efficiency and assembly time. For example, the requirement that the tanker aircraft be positioned at a particular location for defueling into the collapsible tanks necessitates the special handling of the tanker aircraft and limits the number (usually only one) of such aircraft that can be defueled at one time. Also in fueling certain jet aircraft it is necessary to fill the tanks in the aircraft to a certain level and then "back off" or drain fuel from the tanks before the tanks can be completely filled. In the prior art apparatus, this is accomplished by a return line that feeds directly back to the inlet of the collapsible tanks. This return line is under a low pressure which makes the "back off" operation time consuming since only the pressure of the fuel within the aircraft tanks is available to discharge the fuel into the drain line. Furthermore, the use of a high pressure pump at the location of the collapsible tanks, which may be positioned at a distance of several hundred yards from the flight line servicing carts for safety reasons, to circulate fuel to the servicing carts and back to the tanks, necessitates the use of many feet of high pressure heavy duty discharge hose which greatly increases the weight and the assembly time of the fueling apparatus.

The above disadvantages are overcome by the present invention in which a lightweight, reliable and efficient fueling apparatus is provided for transporting fuel to and from aircraft or vehicles and a source of fuel. In accordance with the present invention, a reservoir such as a plurality of collapsible tanks is provided for storing the fuel. A plurality of servicing stations are connected to the reservoir for conveying fuel to and from the aircraft or other vehicles. Each of the servicing stations includes a first and a second port, a pump having an inlet and an outlet and valve means connected between the inlet and the outlet of the pump and the first and second ports. Each of the valve means has two operating positions and is arranged to connect the inlet and the outlet of the pump to the first and second ports, respectively, in one operating position and to connect the inlet and the outlet of the pump to the second and first ports, respectively, in the other operating position. Suitable conduit means such as a lightweight low pressure hose is connected between the first ports of each of the servicing stations and the reservoir. If desired, a main pumping station may be connected between this discharge hose and the reservoir for maintaining a low pressure in the discharge hose to prime the pumps in the servicing stations. Additional conduit means may be connected between the second ports of each of the servicing stations and a vehicle such as an aircraft to be fueled or defueled.

If it is desired to fuel a vehicle connected to one of the servicing stations, the valve means of the servicing station is placed in the first position so that the pump in the servicing station will pump fuel from the first port to the second port to deliver fuel to the vehicle. If it is desired to defuel a vehicle it is only necessary to place the valve means in the second operating position to cause the pump in the servicing station to pump fuel from the vehicle back through the discharge hose and to the tank reservoir. By the use of this apparatus aircraft or other vehicles may be fueled or defueled from the same servicing station thereby eliminating the requirement of positioning a defueling vehicle in a certain position relative to a tank reservoir. Many vehicles can be defueled and fueled at the same time depending upon the number of servicing stations provided. Furthermore the "back off" or defueling operation required during certain fueling operations can be effected very quickly since the pump in each servicing station provides the necessary energy for transporting fuel from the vehicle back to the tank reservoir.

Figure 2:
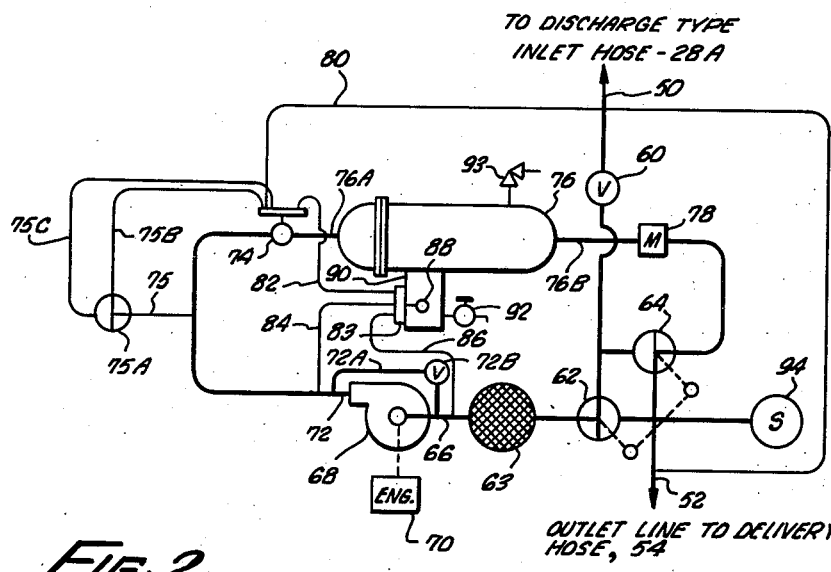

The invention is described in more detail in reference to the accompanying drawing in which:

FIG. 1 is a schematic diagram of a fueling apparatus in accordance with the present invention; and FIG. 2 is a schematic diagram of a servicing station which may be utilized in the apparatus of FIG. 1.

Referring now to the drawing and more particularly to FIG. 1 there is shown a fueling apparatus for transporting fluid fuel to and from vehicles which includes a reservoir formed by a plurality of collapsible rubber tanks 10 for storing a quantity of fuel. The tanks 10 may be of any conventional type such as the collapsible rubber pillow tanks manufactured by the Goodyear Company and may have any desired capacity, for example, ten thousand gallons each. Each of the tanks 10 has an outlet opening 12 connected by a suitable check valve 14 and a gate valve 16 to a header manifold 18 of a main pumping station indicated generally at 19. The check valves 14 control the maximum amount of fuel that is stored in the respective tanks to prevent over filling of any tank. The gate valves 16 permit any one of the tanks 10 to be disconnected from the system. The main pumping station 19 includes a first fluid pump 22, and a high pressure relay by-pass valve 34. The header manifold 18 is connected to the inlet 20 of the pump 22 through a strainer 24. The strainer 24 is in the form of a fine wire mesh screen and serves to separate undesired solid particles from the fuel.

The pump 22 is preferably a centrifugal type pump rather than a positive displacement type of pump and has an outlet 25. Driving means such as an internal combustion engine 26 is provided for driving the pump 22. The outlet 25 of the pump 22 is connected through a manifold structure formed by suitable conduit means such as lightweight discharge hoses 28 to a plurality of servicing stations 30 through gate valves 32 and hose 28A. The high pressure relief by-pass valve 34 is connected between the outlet of the pump 22 and the header manifold 18 through a heat exchanger 36 which may be in the form of a metal pipe with heat dissipating fins welded along its length for dissipating a portion of the heat accumulated in the fuel. The by-pass valve 34 is arranged to by-pass fuel from the outlet to the inlet of the pump 22 when the pressure at the outlet of the pump exceeds a first predetermined value, for example 35 p.s.i. Thus the pressure in the discharge hose 28 adjacent the pump 22 is always kept at or below a first pressure (35 p.s.i). A supply inlet line 40 is connected to the header manifold 18 through a gate valve 42 and a pressure regulating valve 44 for supplying fuel to the tanks 10 from an additional source such as a cross-country pipe line (not shown). The pressure regulating valve 44 reduces the pessure of fuel being introduced into the tanks 10 to a nominal low pressure such as 25 p.s.i. This valve 44 also performs the function of a check valve.

Referring now to FIG. 2, each of the servicing stations 30 includes a first port 50 and a second port 52. The first port 50 is connected to the discharge type inlet hose 28A and the second port 52 is adapted to be connected to the fuel tanks of a vehicle such as an aircraft by means of a delivery hose 54 and nozzles 56 or 58 as shown in FIG. 1. The nozzles 56 are illustrated as center point nozzles which may be utilized in fueling certain jet aircraft. The nozzles 58 are illustrated as over-wing nozzles which may be utilized in fueling other jet aircraft.

The first port 50 of each servicing station is connected through an inlet gate valve 60 to a pair of three-way valves 62 and 64 which may be interlocked mechanically (as shown) or hydraulically. Each of the valves 62 and 64 have two operating positions. In the first operating position, as shown, the valve 62 connects the first port 50 through a line strainer 63 to an inlet 66 of a pump 68 which preferably is of the centrifugal type. The pump 68 is driven by a suitable engine 70 and has an outlet 72 which is connected through a diaphragm flow control valve 74, a filter separator 76, and a flowmeter 78 to the three-way valve 64. The valve 64 when in the first position as shown connects the meter 78 and the outlet of pump 72 to the second port 52. The pump 68 is arranged to provide a pressure of a second predetermined value (i.e. 75 p.s.i.) at its outlet 72 that is substantially greater than the pressure at the outlet of the main pump 22. A by-pass conduit 72A is connected between the outlet 72 of pump 68 and the inlet 66 through a high pressure relief valve 72B to prevent the pump discharge pressure from becoming excessive in case the flow through the flow control valve 74 is stopped or suddenly reduced.

The diaphragm flow control valve 74 is arranged to regulate the pressure at the inlet 76A of the fuel separator 76 to any desired pressure. Flow control valves such as valve 74 are well-known in the art and a detailed description of such a valve is not deemed necessary here. For example, Cla Val Co. of California manufactures such flow control valves which are designated fueling control valves with multiple purpose piloting. A three-way flow setting valve 75A is provided to couple conduits 75 and 75C or 75 and 75B together depending upon the operating position of the valve 75A. When conduits 75 and 75B are connected together the flow control valve 74 is actuated to provide a low pressure of the order of 10 to 15 p.s.i. in the inlet 76A of the filter separator 76 for fueling low pressure ("over-wing") aircraft. When conduits 75 and 75C are connected together the valve 74 is actuated to provide a high pressure (i.e. 50 p.s.i.) in the inlet 76A for fueling high pressure ("center point") aircraft. The flow control valve 74 is also arranged to respond to a predetermined pressure in a surge sensing line 80 to decrease or stop the flow therethrough. When the pressure at the second port 52 exceeds a predetermined value, the pressure in the line 80 causes the valve 74 to decrease or stop the flow therethrough to reduce the pressure at the second port 52.

A filter separator sump signal line 82 is connected between the flow control valve 74 and the outlet of the pump 72 by a pilot pressure supply line 84 to close the flow control valve 74 when the filter separator 76 has accumulated a preselected quantity of a contaminant such as water as will be more fully described.

The filter separator 76 may be of any well-known type and functions to separate undesired contaminants (i.e. water and/or solids) from the fuel passing therethrough. Filter separators for stripping water and solid contaminant from the fuel are generally necessary to maintain the desired degree of purity of the fuel. Such filter separators are well-known in the art and are manufactured by the Bowser Co., Briggs Filtration Co., Warner Lewis Inc., Filters Inc., Bendix-Skinner, Purolator, Permanent Flters Corp., and others. The water stripped out of the fuel by the filter separator 76 accumulates in a sump 90 within which a float 88 is ballasted to ride the fuel water inter-face. When the water in the sump 90 rises above a safe level, the float 88 trips a sliding three-way valve 83 of conventional configuration and connects the sump signal line 82 with the pilot pressure line 84 to close the flow control valve 74 and stop the flow of fuel to the filter separator. A drain line 86 is provided for relieving the high pressure from the pilot pressure line 82 when the float 88 is restored to a normal level by draining the water contaminant from the sump 92. The water in the sump 90 may be manually drained by means of a gate valve 92. An air eliminator 93 is provided in the filter separator 76 to remove air from the fuel and initially from the filter separator case.

A surge suppressor 94 is connected to the second port 52 to absorb high pressure surges which may result when the nozzle connecting the second port 52 to the fuel tank of an aircraft is turned off or when the internal tank valves on the aircraft being fueled close.

In operation, when the three-way valves 62 and 64 are arranged in the first position as shown, the pump 68 pumps fuel from the first port 50 and the discharge hose 28 through the filter separator, the second port 52 and into the fuel tank of the aircraft being fueled by means of a suitable nozzle. When it is desired to unload fuel from a vehicle such as a tanker aircraft, the valves 62 and 64 are rotated to their second position in which the inlet of the pump 68 is connected to the second port 52 and the outlet 76B of the filter separator is connected to the first port 50. In this arrangement the pump 68 functions to pump fuel from the unloading vehicle to the discharge hose 28A, through the pump 22 or the by-pass valve 34 into the header manifold 18 and then into the tanks 10. It should be noted that the centrifugal pump 22 will allow fuel to pass in a reverse direction with little impedance to the flow when the engine 26 is turned off. If the pump 22 is operating, the by-pass valve 34 will function to pass fuel that is being unloaded around the pump 22 and into the header manifold 18. Thus a tanker aircraft may be defueled by one servicing station whether or not the pump 22 is functioning and independently of the operation of the remaining servicing stations.

Each of the servicing stations 30 may fuel or defuel a vehicle and a plurality of vehicles may be fueled or defueled simultaneously. For example, three vehicles could be defueled and three vehicles fueled at the same time by utilizing six servicing stations.

The second ports 52 of two or more servicing stations 30 may be connected in parallel through hoses 54 to a single nozzle 56 to increase the flow rate through the nozzle or the second port 52 or any servicing station may be utilized to supply fuel through two smaller hoses 57 to two or more nozzles 58.

The apparatus of this invention may be utilized to transport any type of fluid fuel such as jet fuel, gasoline or liquid or gaseous rocket fuel. While the apparatus has been described primarily in conjunction with aircraft, it should be noted that the apparatus of this invention may be utilized for transporting fuel to any vehicle or for transporting fluids such as gases or liquids for other purposes. For example, the apparatus may be utilized for transporting oxidizers for missile fueling. The main pumping station and the servicing stations may be mounted on suitable vehicles to facilitate the positioning of these stations at a landing field and within a transporting aircraft. The fueling apparatus of this invention may be easily and conveniently transported by a single aircraft and may be assembled in a very short time (two or three hours) into an operable system.

I claim:

1. In an apparatus for conveying fuel from a fuel reservoir to vehicles to be fueled, from vehicles to be defueled to said fuel reservoir, and from vehicles to be defueled to vehicles to be fueled, and for separating solid and liquid contaminants from the fuel conveyed to each vehicle to be fueled, the combination comprising a main pumping station including a first pump having an inlet and outlet, a high pressure by-pass valve connected between the inlet and the outlet of the first pump for maintaining the outlet pressure of the first pump below a first predetermined pressure, a plurality of servicing stations, each servicing station including first and second ports, a second pump having an inlet and an outlet and being arranged to provide an outlet pressure greater than said first pressure, a fuel filter separator having an inlet and an outlet and being arranged to separate contaminants from fuel passing therethrough, means connecting the outlet of the second pump to the inlet of the filter separator, selectively actuable valve means for selectively connecting the inlet of the second pump and the outlet of the filter separator to the first and second ports, respectively, and for selectively connecting the inlet of the second pump and the outlet of the filter separator to the second and first ports, respectively, and a hose permitting fueling and defueling of a vehicle therethrough and being connected to the second port, the apparatus including a manifold structure having at least one inlet connected to the outlet of the first pump and a plurality of outlets connected to the first ports of said plurality of servicing stations.

2. The combination as defined in claim 1 wherein said selectively actuable valve means comprises a pair of interlocked three-way valves.

3. In an apparatus for conveying fuel from a fuel reservoir to vehicles to be fueled, from vehicles to be defueled to said fuel reservoir, and from vehicles to be defueled to vehicles to be fueled, and for separating solid and liquid contaminants from the fuel conveyed to each vehicle to be fueled, the combination which comprises a main pumping station including a first pump having an inlet and outlet, a high pressure by-pass valve connected between the inlet and the outlet of the first pump for maintaining the outlet pressure of the first pump below a first predetermined pressure, a plurality of servicing stations, each servicing station including first and second ports, a second pump having an inlet and an outlet and being arranged to provide an outlet pressure greater than said first pressure, a fuel filter separator having an inlet and an outlet and being arranged to separate contaminants from fuel passing therethrough, a flow control valve connected between the outlet of the second pump and the inlet of the filter separator, a high-pressure relief valve connected between the inlet and the outlet of the second pump for preventing the outlet pressure of the second pump from becoming excessive, selectively actuable valve means for selectively connecting the inlet of the second pump and the outlet of the filter separator to the first and second ports, respectively, and for selectively connecting the inlet of the second pump and the outlet of the filter separator to the second and first ports, respectively, and a hose permitting fueling and defueling of a vehicle therethrough and being connected to the second port, the apparatus including a manifold structure having at least one inlet connected to the outlet of the first pump and a plurality of outlets connected to the first ports of said plurality of servicing stations.

References Cited in the file of this patent

UNITED STATES PATENTS

| | | |
|---|---|---|
| 1,809,432 | Webb | June 9, 1931 |
| 2,017,345 | Granberg | Oct. 15, 1935 |
| 2,906,435 | Nichols | Sept. 29, 1959 |
| 2,932,331 | Reed | Apr. 12, 1960 |
| 2,938,535 | Brear | May 31, 1960 |
| 2,948,306 | Kuraeff | Aug. 9, 1960 |
| 2,960,106 | Dyer et al. | Nov. 15, 1960 |